Jan. 18, 1949.　　　A. F. KOPISCHIANSKY　　　2,459,535
SERVO UNIT TEST STAND

Filed May 14, 1945　　　　　　　　　　　　　3 Sheets-Sheet 1

INVENTOR.
ANDREW F. KOPISCHIANSKY
BY
Frank H. Harmon
ATTORNEY.

Jan. 18, 1949.  A. F. KOPISCHIANSKY  2,459,535
SERVO UNIT TEST STAND
Filed May 14, 1945  3 Sheets-Sheet 2

INVENTOR.
ANDREW F. KOPISCHIANSKY
BY
*Frank N. Harmon*
ATTORNEY

Jan. 18, 1949.  A. F. KOPISCHIANSKY  2,459,535
SERVO UNIT TEST STAND

Filed May 14, 1945  3 Sheets-Sheet 3

INVENTOR.
ANDREW F. KOPISCHIANSKY
BY
*Frank H. Harmon*
ATTORNEY

Patented Jan. 18, 1949

2,459,535

UNITED STATES PATENT OFFICE 2,459,535

SERVO UNIT TEST STAND

Andrew F. Kopischiansky, Maple Heights, Ohio, assignor, by mesne assignments, to Jack & Heintz Precision Industries, Inc., Cleveland, Ohio, a corporation of Delaware Application May 14, 1945, Serial No. 593,618

7 Claims. (Cl. 73—37)

This invention relates to a test stand for testing aircraft hydraulic servo units and the like.

In the manufacture of hydraulic servo units certain routine inspections and tests are necessary to check the precision of manufacture in the operation of the completed unit and the object of the present invention is to provide a convenient test stand for performing the necessary tests rapidly and accurately on the production line.

There are certain important requirements which must be satisfied before a servo unit is acceptable for use in aircraft. Each piston must be free to move throughout its full stroke with a maximum pull or push of a designated number of pounds. With one end open to the atmosphere and the opposite end under oil pressure the servo motor valves must be adjustable to sustain the operating pressures in both directions, and the valves must be capable of retaining their adjustments within certain pressure limits. No external leakage is permissible when the servo unit is subjected to a certain designated excess pressure except from the piston rod end glands where a leakage of only a few drops per minute is permissible. Permissible leakage around the piston must not exceed and preferably be less than a specified number of cubic centimeters per minute. Also, the individual pistons must be capable of exerting the scale pull for which they are designed, at operating pressures.

The specific objects of the present invention are to provide a test stand for quickly and easily performing the various tests required to determine if a servo unit meets the above individual requirements.

Figure 1:
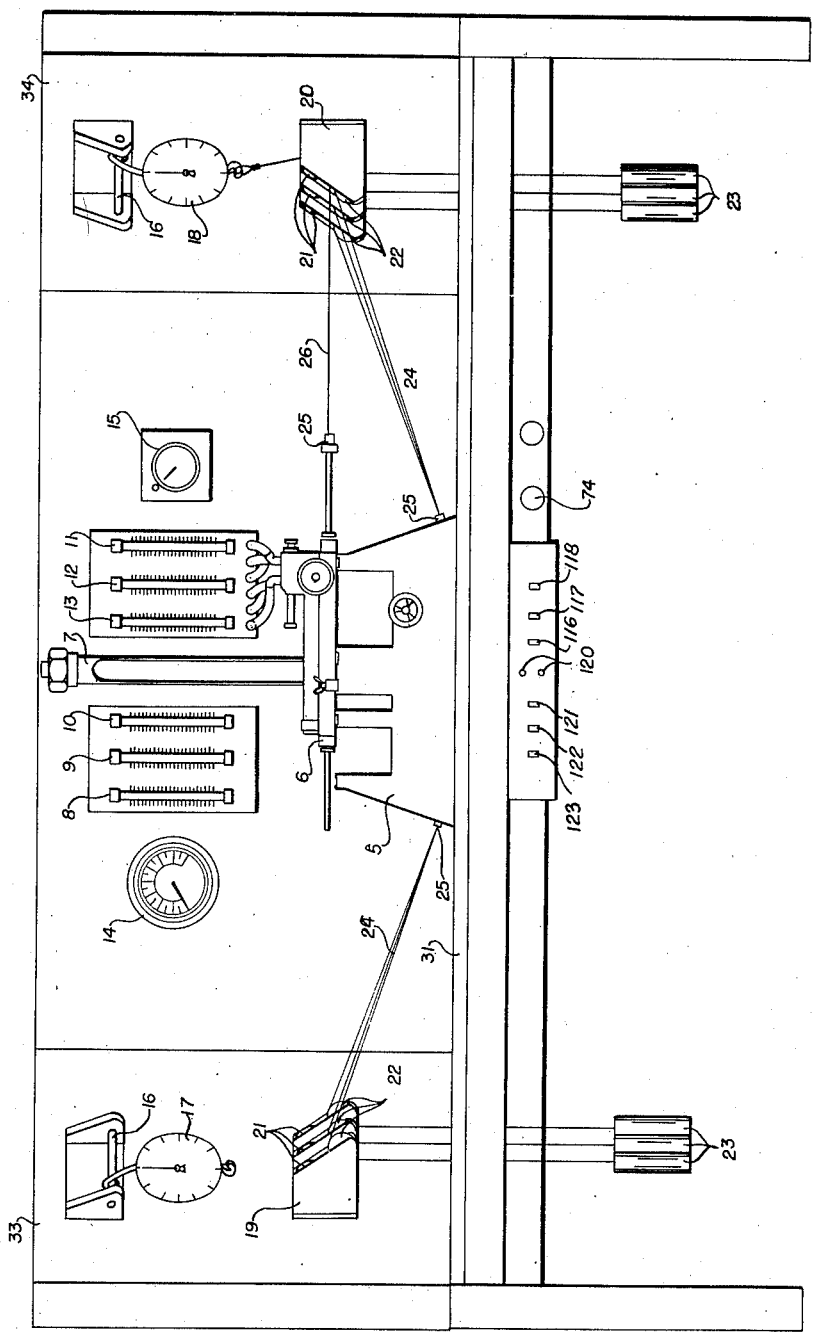
Figure 2:
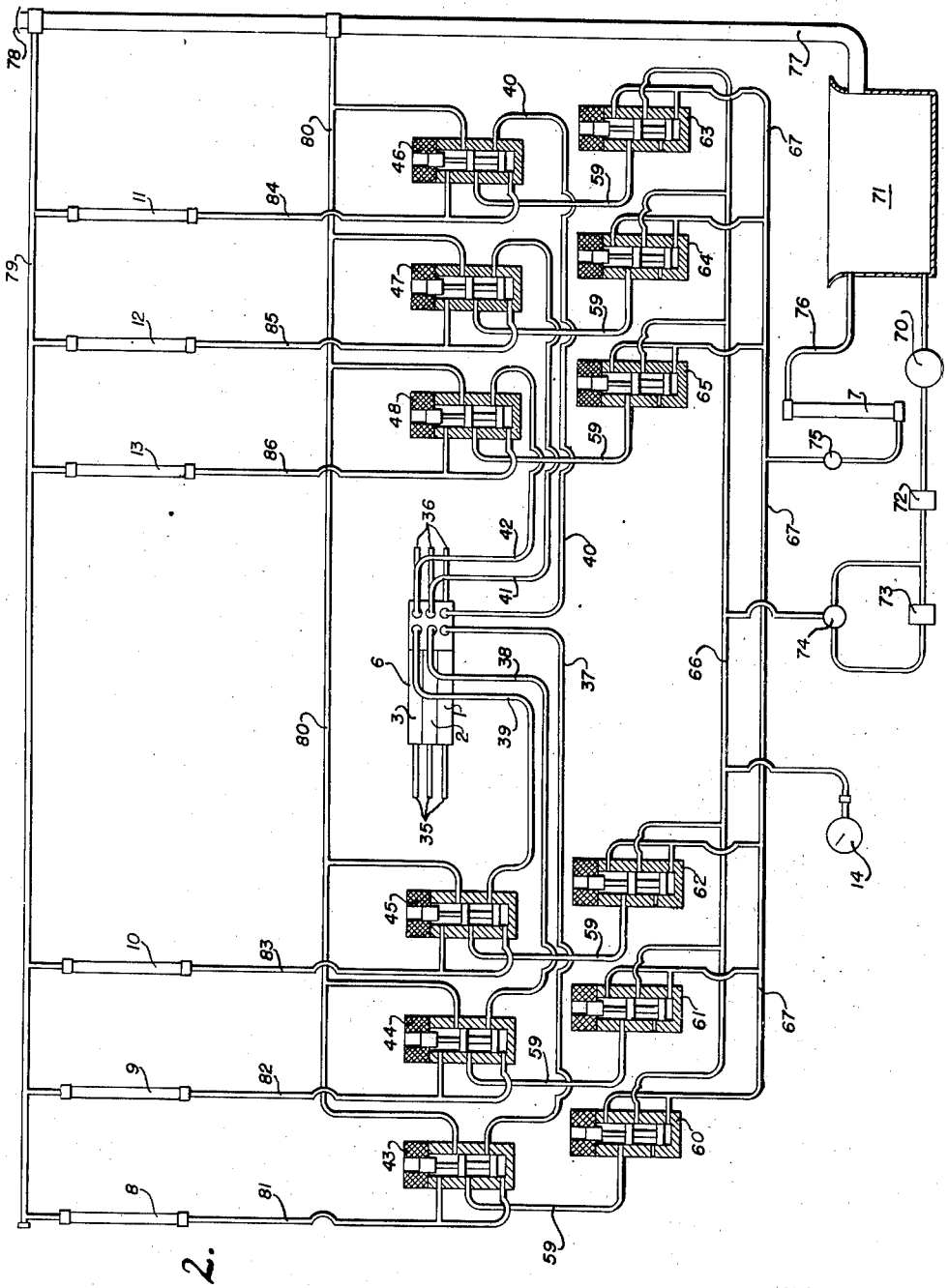
Figure 3:
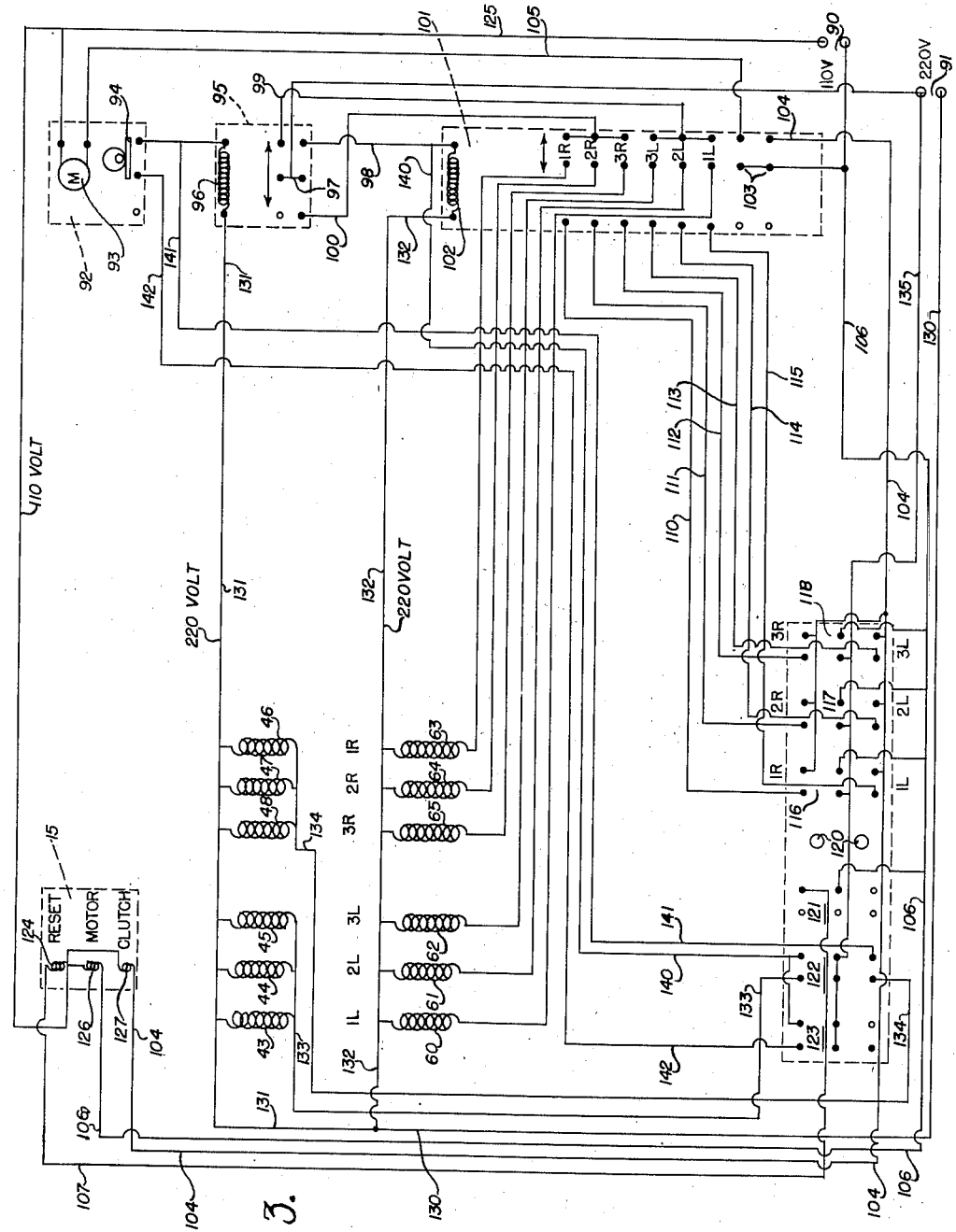

These and other objects will be apparent to those skilled in the art as the specification proceeds in connection with the accompanying drawings illustrating the preferred embodiment in which, Figure 1 is a front elevational view of the test stand, Figure 2 is a piping diagram of the hydraulic system in the test stand and, Figure 3 is a schematic wiring diagram of the electrical system for operating the hydraulic system and performing other functions.

Referring first to Figure 1 the numeral 31 indicates a bench having a rear panel 32 and end panels 33 and 34 arranged in the manner shown. Centrally located on the bench 31 is a supporting jig 5 provided with means to clamp a servo unit 6 thereon. The rear panel carries a large gage glass 7 and smaller gage glasses 8 to 13. Also at opposite ends of the rear panel are a liquid pressure gage 14 and a clock 15. The end panels 33 and 34 are each provided with a horizontal bar 16 for supporting spring scales 17 and 18 immediately above the pulley blocks 19 and 20. Each of these pulley blocks is provided with three upper pulleys 21 and three lower pulleys 22 aligned with the respective piston rods of the servo unit. Weights 23 are supported by cables 24 passing over the lower pulleys 22 and provided with connectors 25 adapted to make connection with the individual servo motor piston rods for measuring the pull thereof. When not in use the weights 23 may be supported in the manner shown by hooking the connectors 25 over suitable anchoring means in the lower part of the base 5. One or more cables 26 having connectors 25 thereon are provided for attaching the piston rods to the scale 18 for measuring the pull on the piston rod.

As best shown in Figure 2, the servo unit 6 for which the present test stand is designed has three cylinders 1, 2 and 3 having three pistons which may be moved by hydraulic pressure either to the right or to the left. The three pistons are connected with the left hand piston rods 35 and right hand piston rods 36 for actuation of the control surfaces of an aircraft. The three cylinders have hydraulic lines 37, 38 and 39 communicating with the left ends thereof and hydraulic lines 40, 41 and 42 communicating with the right ends thereof. It is understood that these hydraulic lines are alternately pressure and relief lines when the servo unit is operating, depending upon the direction the piston is moving. The above-mentioned hydraulic lines communicate with solenoid valve assemblies 43 to 48 in the manner shown.

A plurality of pipes 59 connect the above-mentioned solenoid valves with another series of solenoid valves 60 to 65, each of the latter being connected with a pressure line 66 and a relief line 67. Hydraulic pressure is established in the pressure line by means of pump 70 supplied from a sump 71. Pressure regulators 72 and 73 associated with a push-pull valve 74 provide for establishing either a normal operating pressure or a high test pressure in the system. The relief line 67 discharges through a valve 75 into the bottom of the tube 7. Tube 7 overflows through a pipe 76 into the sump. A large return line 77 also discharges into the sump, this line being open to atmospheric pressure at some high point 78 in the system.

The return or sump line 77 connects with a pipe 79 receiving the overflow from each of the gage glasses 8 to 13, and with a pipe 80 connected in turn to each of the solenoid valves 43 to 48. The gage glasses 8 to 13 are supplied by pipes 81 to 86 communicating with two ports in each of the solenoid valve assemblies 43 to 48.

Figure 3 discloses an electrical system for operating the various solenoid valve assemblies in the hydraulic systems to control hydraulic pressures in the system to perform the desired tests. The electrical system comprises a bank of switches for operating the servo pistons individually, right or left, means for resetting the clock, means for moving the pistons simultaneously to the right or to the left and connecting the relief lines with the gage glasses for measuring leakage, and means to provide automatic cycling to run in the servo unit under continuous operation for any desired time.

A 110 volt supply 90 is used for the clock and intermittent contactor for cycling, and a 220 volt supply 91 is used for the solenoid and electromagnetic switch. The intermittent contactor is indicated by the numeral 92 and comprises a small motor 93 for continuously moving a switch arm 94 to produce periodic energization of a contactor 95 having an energizing winding 96 and a movable contact element 97 shown in mid-position. When the winding 96 is energized the contact element 97 moves to the right in the direction of the arrow to complete circuits through lines 98 and 99. When the winding 96 is not energized the contact element 97 rests in its opposite position completing a circuit through line 100, the movable contact element itself being connected with one side of the supply 91.

The numeral 101 designates a plural circuit contactor having an energizing winding 102 for moving an armature carrying the contacts 103 and 1L, 2L, 3L, 1R, 2R, and 3R to the right, as indicated by the arrow, to complete circuits through lines 99, 100, 104, and 105. When the winding 102 is not energized the movable armature returns the movable contacts into engagement with an opposite set of stationary contacts for energizing lines 110 to 115 connected with three double-pole double-throw switches 116, 117, and 118. The numeral 120 indicates a push-button switch for starting and stopping the pump 70 which is designed to run continuously.

Switches 121 to 123 are similar to the switches 116 to 118 but have only certain of their contacts wired into active circuits. The switch 121 completes a circuit from the wire 106 leading to the 110 volt supply, through a line 107 to the reset winding 124 of the clock 15. A line wire 125 from the 110 volt supply 90 is connected with the intermittent contactor motor 93 and with the reset, motor, and clutch windings of the clock, the latter being designated by the numerals 126 and 127. The clock motor circuit is completed through line 106, and the clutch circuit is completed through line 104 which is connected with the switches 116 to 118 for energization in all positions of these switches and connected with a stationary contact engageable by one of contacts 103 in contactor 101.

The 220 volt supply 91 is connected through a line 130 which branches into the two lines 131 and 132 to connect with the solenoid coils and the contactor windings 96 and 102. The circuits of solenoid valve assemblies 43 to 48 are completed through wires 133 and 134 leading to the opposite sides of switch 122 and thence to the other side of the line 135. The circuits for the solenoid valve assemblies 60 to 65 lead to the movable contact elements 1L, 2L, 3L, 2R, and 3R to be completed through the lines 110 to 115 when the contactor coil 102 is de-energized and through to the lines 99 and 100 when this contactor is energized. The lines 110 to 115 are adapted to be selectively connected with the line wire 135 in the different positions of switches 116 to 118, and one or the other of the lines 99 and 100 is connected with the 220 volt supply at the line 135 by the movable contact 97 in contactor 95.

The individual operation of the servo pistons will first be described, whereby the piston may be allowed to travel freely to the end of its stroke or may be connected with a cable 26 to register the pull on the scale 18. Assuming both contactors 95 and 101 to be de-energized, the closing of the switch 116 to the position designated 1R will be seen to complete a circuit from the line 135 through the wire 110 and movable contact 1R on the large contactor 101 to solenoid valve assembly 63 and returning through wires 132 and 130. Energization of the solenoid valve assembly 63 lifts the valve piston and thereby admits pressure from the pressure line 66 to pipe 59 and thence through the de-energized solenoid valve assembly 46 through pipe 40 to the right side of the cylinder 1 to move its piston to the left. When the piston thus moves to the left, the left end of the cylinder is connected through pipes 37 and 59, and de-energized solenoid valves 43 and 60, with the relief line 67. When the switch 116 is thrown to its 1L position a similar circuit is completed from wire 135 through movable contact 1L on the contactor 101 to energize solenoid valve assembly 60 to admit fluid pressure through the lines 66, 59 and 37 in a similar manner to the left end of cylinder 1 to move the piston to the right. When the piston is moved to the right, the right end of the cylinder is connected through pipes 40 and 59, and de-energized solenoid valves 46 and 63, with relief line 67. Whichever way the switch is moved a circuit is completed through wire 104 to engage the clutch of the clock for a timing interval. After each operation the clock may be reset by momentarily closing switch 121. The switches 117 and 118 operate in a similar manner to produce individual left and right movements of the pistons in the cylinders 2 and 3 under manual control, the electrical and hydraulic circuits for these cylinders corresponding to the circuits just described for cylinder 1.

The switch 122 is effective to move all the pistons either to the right or to the left and to connect the relief ends of the cylinders to the appropriate gage glasses to visually indicate the leakage in a particular time interval. Thus, if switch 122 is moved to its upper position a circuit will be completed from line 135 of the 220 volt supply through line 133 and solenoid valve assemblies 43 to 45 so as to connect the gage glasses 8, 9, 10 through their pipes 81, 82, 83 with the left ends of the cylinders 1, 2, 3 respectively, and to cut off these gage glasses from the sump line 80 to which they are normally connected when the solenoid valves 43 to 45 are de-energized. This position of the switch also completes a circuit from wire 135 through wire 140 to energize contactor coil 102 through return wires 132 and 130 to move the armature thereof to the right. This position of the armature establishes circuits through solenoid valve assemblies 63 to 65, these circuits being completed through line 100 through the contactor 95 which is de-energized. Energization of solenoid valve assemblies 63 to 65 connects the pressure line 66 with the three servo motor lines 40 to 42 to the de-energized solenoid valves 46 to 48 to move the servo pistons to the left. Any hydraulic fluid leaking past the by-pass or past the pistons in the servo unit will then appear in the gage glasses 8, 9, and 10. When the switch 122 is moved to its opposite or lower position the solenoid valves 46 to 48 will be energized by wire 134 to connect the gage glasses 11 to 13 with the right ends of the servo cylinders. The contactor winding 96 will also be energized through wires 141 and 131 to operate that contactor to energize the winding 102 of the contactor 101 through wires 130, 132, and 98. Actuation of both contactors 95 and 101 in this manner will be seen to complete circuits through the movable contact elements 1L, 2L, and 3L to energize solenoid valve assemblies 60 to 62. This will establish hydraulic connections similar to those previously described in this case connecting the pressure line 66 with the servo unit lines 37 to 39 to move the three pistons to the right. Internal leakage will appear in the gage glasses 11 to 13.

The switch 123 has only one "on" position and its purpose is to produce automatic cycling of the servo pistons back and forth under the control of the intermittent contactor 92. Closing of this switch establishes a circuit through one pole from wire 135 through wires 140, 132, and 130 to energize the contactor 101, moving all the movable contact elements to the right in the direction of the arrow. Thus, the contact elements 103 keep 110 volt circuits through the intermittent contactor motor 93 and the clock clutch 127. The other pole of switch 123 completes a circuit from wire 135 through wire 142 and the intermittent contactor to intermittently energize contactor 95 through return wires 131 and 130. The intermittent contactor is designed to produce on and off intervals of approximately equal duration so that the movable contact element 97 in the conductor 95 will establish circuits in the lines 99 and 100 alternately and of substantially equal duration. The line 99 energizes the solenoid valves 60 to 62 to admit fluid under pressure to the left ends of the cylinders to move the three servo pistons in unison to the right, and the line 100 energizes the solenoid valve assemblies 63 to 65 to admit pressure fluid to the right ends of the cylinders to move the servo pistons to the left, the frequency of reciprocation being that of the intermittent contactor 92.

Thus, the above described switching arrangements provide for applying hydraulic pressure to opposite ends of the servo cylinders individually to test the pulling power of the pistons in opposite directions and to measure the leakage from the individual cylinders. The pistons may also be moved to opposite ends of the cylinders simultaneously by a single switch manipulation and by another switch they may be set in continuous reciprocation for any desired length of time under the control of automatic cycling mechanism. Each of these tests may be timed by an electric clock having a magnetic clutch to initiate a timing interval coincidentally with the actuation of the solenoid valves involved in the particular test.

Various changes may be made in the construction and arrangement of parts, and in the electric and hydraulic circuits, within the spirit of the invention, and all such modifications within the scope of the appended claims are included in the invention.

I claim:

1. In a test stand for multiple cylinder and piston servo units, a system of hydraulic lines adapted to be connected to opposite ends of said servo unit cylinders to operate the pistons therein, a hydraulic pressure line, a hydraulic relief line, a plurality of solenoid valves for selectively connecting said pressure and relief lines with different ones of said hydraulic lines to operate said servo unit in a particular manner, an electrical control system having switch means for selectively energizing said solenoids to produce movement of said pistons individually, in unison for one stroke and in unison for repeated cycle operation, and clock means controlled by said electrical system for automatically timing the duration of the particular condition set into said hydraulic system by said electrical system, said clock means having a clutch circuit actuated by said switch means to initiate a timing interval coincidentally with the energization of said solenoids.

2. In a test stand for multiple cylinder and piston servo units, a plurality of hydraulic lines adapted to be connected to opposite cylinder ends of a servo unit to be tested, hydraulic pressure and relief lines, a plurality of calibrated gage glasses equal to the number of cylinder ends in the servo unit to be tested, a first plurality of solenoid valves for connecting said pressure and relief lines with said hydraulic lines so as to admit pressure in predetermined ends of the servo unit cylinders and to connect the low pressure cylinder ends to the relief lines, and a second set of solenoid valves operable to connect said gage glasses with the low pressure ends of the servo unit cylinders and to disconnect the relief lines therefrom to measure internal leakage in each of said servo unit cylinders individually.

3. In a test stand for multiple cylinder and piston servo units, a plurality of hydraulic lines adapted to be connected with opposite cylinder ends of a servo unit to be tested, hydraulic pressure and relief lines, a plurality of liquid gage glasses corresponding to the number of cylinder ends in said servo unit, a first series of solenoid valves arranged to connect said relief line and disconnect said pressure line from said servo unit when said valves are de-energized and to disconnect said relief line and connect said pressure line to respective hydraulic lines connected with said servo unit when energized, a second set of solenoid valves connected with said first set of solenoid valves so as to establish communication between said cylinder ends and said first solenoid valves and to connect said gage glasses with another relief line when de-energized and when energized to disconnect said pressure lines from said servo unit and to connect said gage glasses with respective low pressure ends of cylinders in said servo unit.

4. In a multiple cylinder and piston hydraulic servo unit test stand a plurality of hydraulic lines adapted to be connected to the operating connections of said servo unit, at opposite cylinder ends pressure and relief lines, a plurality of liquid gage glasses corresponding to the number of cylinder ends in said servo unit, a first series of solenoid valves there being one valve corresponding to each cylinder end in the servo unit, a second set of solenoid valves, each valve being connected to one cylinder end in said servo unit and to one of the solenoid valves in the first set, pressure and relief line connections with said valves in said first set, and connections between each valve of said second set and its corresponding liquid gage glass, said hydraulic connections and valves being arranged so that when the valves of said first set are de-energized they open relief lines and close pressure lines to said servo unit and when energized they close relief lines and open pressure lines in said servo unit, the valves of the second set establishing communication between said servo unit and the valves of the first set and connecting the liquid gage glasses with a separate relief line when de-energized, and disconnecting said relief line from said gage glasses and connecting lines from the gage glasses to the servo unit when energized.

5. A servo unit test stand comprising a plurality of solenoid valves for controlling pressure and relief lines to opposite ends of individual cylinders in the servo unit, a clock having reset and clutch circuits, a plurality of switches for energizing individual solenoids to admit hydraulic pressure to a predetermined cylinder end, said switches also including means for closing said clutch circuit to start a timing operation coincident with the admission of hydraulic pressure to the servo unit and a switch for closing said reset circuit to reset said clock.

6. A multiple cylinder and piston hydraulic servo unit test stand comprising solenoid valves for connecting the servo unit to be tested with hydraulic pressure and relief lines, a liquid gage glass for each cylinder end in the servo unit to be tested, additional solenoid valves interconnected electrically and hydraulically with said first solenoid valves for connecting individual ends of cylinders in said servo unit with said liquid gage glasses individually, electrical operating circuit for said solenoid valves, and switch means for controlling said circuits to produce operation of the servo unit pistons in either direction and for connecting pressure lines to certain ends of the servo unit cylinders and gage glasses to opposite ends of the cylinders to measure internal leakage in the servo unit.

7. A multiple cylinder and piston servo unit test stand comprising a first set of solenoid valves, one for each cylinder end of said servo unit and each valve being connected to one of said cylinder ends, a series of gage glasses, one for each cylinder end and each gage glass being connected to one of said valves, a relief line connected to each of said valves to drain said gage glasses, a second set of solenoid valves, each valve of said second set being connected to one valve of said first set, and pressure and relief lines connected with the valves of said second set and adapted to be connected with said cylinder ends through said first set of valves.

ANDREW F. KOPISCHIANSKY.

REFERENCES CITED

The following references are of record in the file of this patent:

UNITED STATES PATENTS

| Number | Name | Date |
| --- | --- | --- |
| 627,385 | Brockie | June 20, 1899 |
| 946,264 | Park et al. | Jan. 11, 1910 |
| 1,477,960 | Hutchison | Dec. 18, 1923 |
| 1,632,905 | Kennedy | June 21, 1927 |
| 1,649,994 | Thal | Nov. 22, 1927 |
| 1,664,557 | Hannan | Apr. 3, 1928 |
| 1,967,887 | Johnston | July 24, 1934 |
| 2,172,095 | White | Sept. 5, 1939 |
| 2,198,411 | Love | Apr. 23, 1940 |
| 2,226,856 | Gunter | Dec. 31, 1940 |
| 2,379,668 | Wacker | July 3, 1945 |
| 2,380,510 | Fitch | July 31, 1945 |